Jan. 10, 1939.    H. E. VAN DERHOEF    2,143,810
FILM HANDLING MACHINE
Filed Nov. 19, 1937        2 Sheets—Sheet 1
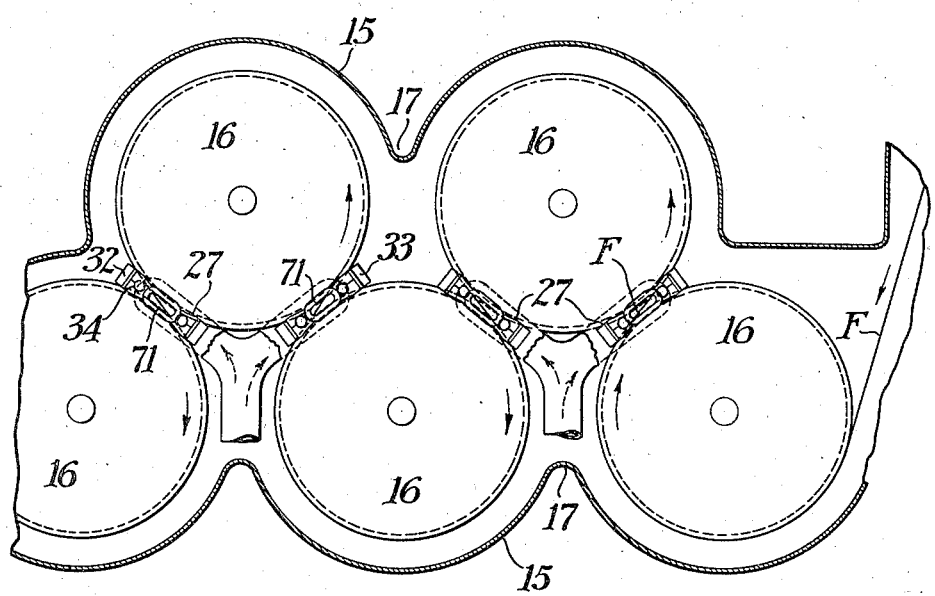
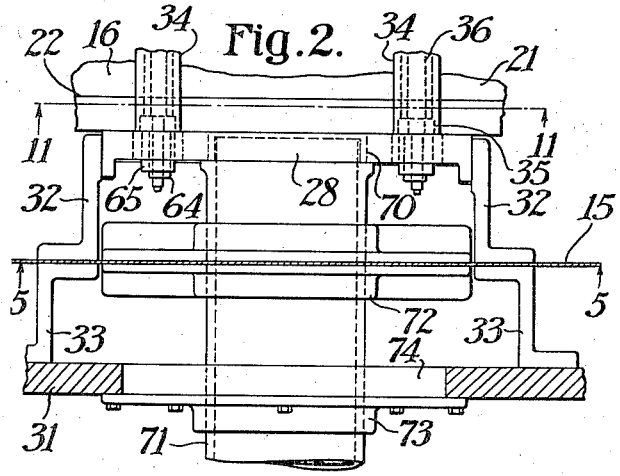
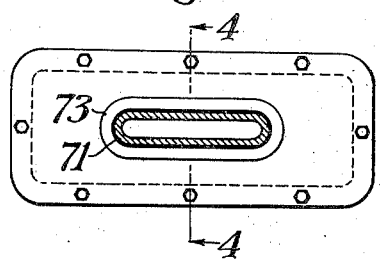
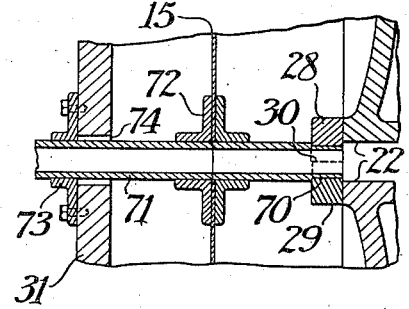
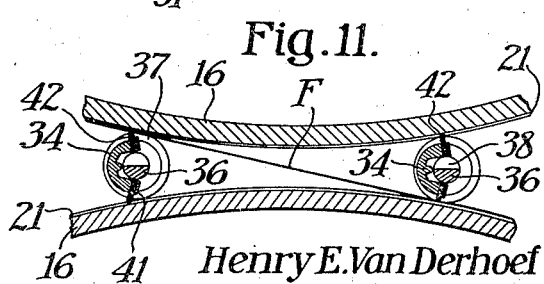
Henry E. Van Derhoef
INVENTOR
BY
ATTORNEYS

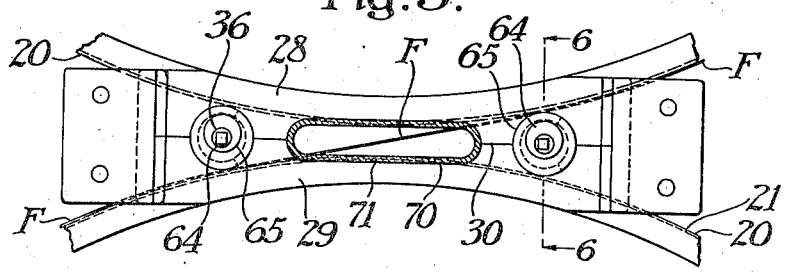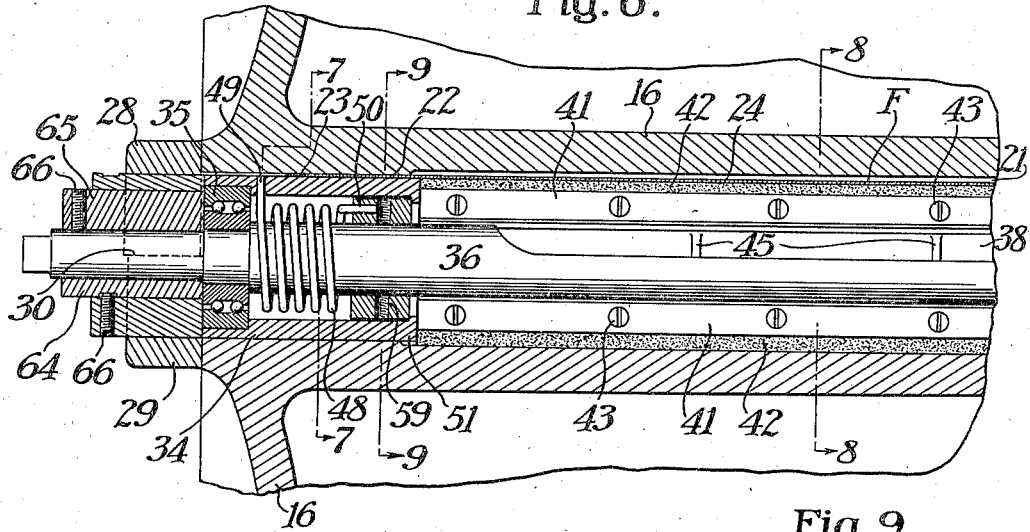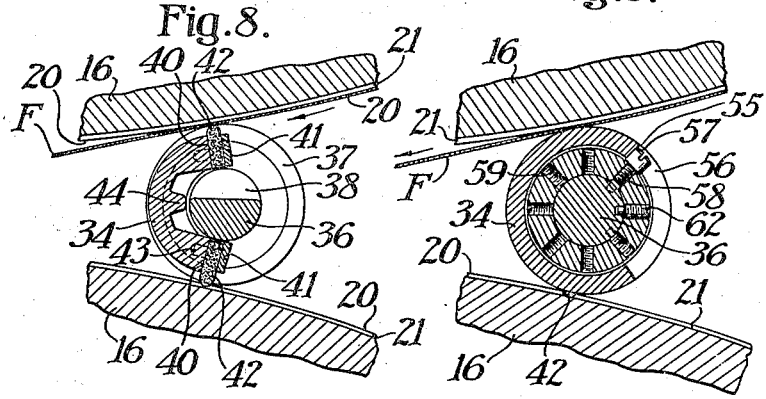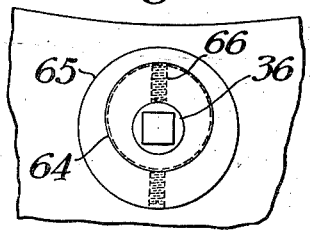

Patented Jan. 10, 1939

2,143,810

UNITED STATES PATENT OFFICE 2,143,810

FILM HANDLING MACHINE

Henry E. Van Derhoef, Rochester, N. Y., assignor to Eastman Kodak Company, Rochester, N. Y., a corporation of New Jersey Application November 19, 1937, Serial No. 175,491

14 Claims. (Cl. 271—2.3)

The present invention relates to film handling machines, and more particularly to an arrangement for supporting a relatively long length or strip of film during its passing through the machine.

One object of the invention is the provision of an arrangement for floating the body of the film strip over the feeding drum so as to prevent contact between the body of the film and the face of the drum.

Another object of the invention is the provision of an arrangement by which the edges of the strip are supported and advance by the feeding drum, while the portion of the strip intermediate the edges is supported by means of fluid pressure.

A further object of the invention is the provision of an arrangement for applying a fluid pressure between the body of the strip and the face of the feeding drum.

Still another object of the invention is the provision of an arrangement for effectively sealing the space where the strip passes from one drum to the next so as to maintain the proper fluid pressure to support the body of the film strip.

A still further object of the invention is the provision of an arrangement by which the sealing means may be adjusted so as to compensate for any misalignment of the feeding drums.

Yet another object of the invention is the provision of a sealing arrangement which effectively seals the space where the strip passes from one drum to the next, but is movable to a non-sealing position to permit threading of the strip over the feeding drum, yet is automatically returnable to the sealing position upon completion of the threading operation.

Another object of the invention is the provision in a sealing means of the class described of an arrangement for controlling the return of the sealing means to the sealing position.

To these and other ends, the invention resides in certain improvements and combinations of parts all as will be hereinafter more fully described, the novel features being pointed out in the claims at the end of the specification.

In the drawings:

Fig. 1 is a side view of a portion of the curing section of a film forming machine, with the side plate removed, showing the film feeding or advancing drums, and relation thereto of the film supporting arrangement constructed in accordance with the present invention;

Fig. 2 is a horizontal sectional view taken through the section illustrated in Fig. 1, just above one of the lower drums, showing the arrangement of the air ducts for supplying air or fluid pressure to the space between the upper and lower drums to float the film strips thereover;

Fig. 3 is an end view of the construction illustrated in Fig. 2;

Fig. 4 is a sectional view taken substantially on the line 4—4 of Fig. 3, showing the relation of the air ducts to the adjacent feeding or advancing drum;

Fig. 5 is a horizontal sectional view taken substantially on the line 5—5 of Fig. 2, showing the double eccentric plug for adjusting the sealing means along the center line between the faces of the adjacent drums;

Fig. 6 is a vertical sectional view taken substantially on the line 6—6 of Fig. 5, showing the arrangement of the sealing mechanism positioned between the faces of the drums, and the means for adjusting this sealing means;

Fig. 7 is a vertical sectional view taken substantially on the line 7—7 of Fig. 6, showing the resilient means for automatically returning the sealing means of Fig. 6 to sealing position after threading of the machine.

Fig. 8 is a vertical sectional view taken substantially on the line 8—8 of Fig. 6, showing the detailed construction of the sealing means illustrated in Figs. 5 and 6;

Fig. 9 is a vertical sectional view taken substantially on the line 9—9 of Fig. 6, showing the arrangement for adjusting the coil spring illustrated in Fig. 7, and also showing the arrangement for limiting the return of the sealing means after the threading operation;

Fig. 10 is an end view of the machine shown in Fig. 6 taken from the left, showing the double plug eccentric for adjusting the sealing means, as shown in Fig. 6, along the center line between the adjacent drums; and Fig. 11 is a vertical sectional view taken substantially on the line 11—11 of Fig. 2, showing the specific arrangement of the supporting shafts and the sealing members where the adjacent drums approach and recede from each other.

Similar reference numerals throughout the various views indicate the same parts.

In the manufacture of photographic film, a thin sheet or strip of transparent material is first formed by continuously applying a "dope" to a coating wheel. As this "dope" is carried around by the wheel, sufficient solvents are removed from the "dope" so that the latter may be stripped from the coating wheels in the form of a continuous web or strip. This strip is then passed in a sinuous or curved path over a series of rollers positioned in the drying or curing section of the machine, so as to remove the remaining solvents. The finished or cured strip is then wound onto a suitable core, and constitutes what is known to the trade as "film support." As this uncured or "green" strip leaves the casting wheel, it is somewhat soft and may be easily scratched or wrinkled, and will also readily pick up specks of dirt or dust, the disadvantages of which are apparent to those in the art. With the increase of the sensitivity of emulsions to various wave lengths of light, in all parts of the spectrum, it is necessary to eliminate such scratches, wrinkles, or dirt so as to permit perfect transmission of light through the support.

It has been found that such scratches and wrinkles may be formed by contact of this uncured strip with the surfaces of the feeding drums in the curing section of the machine. To this end, the present invention provides an arrangement for floating the film base or support over the drums of the curing section, the drums engaging the strip only at its edges while the body of the strip intermediate the edges is floated on air so as to be held out of contact with the faces of these drying or curing drums. While the invention is primarily intended to float a film support through the curing portion of the machine, it is obvious that such a floating arrangement is adapted to support substantially any type of strip material so as to prevent damage of the surfaces thereof. The term "film" is, therefore, intended to be used in a generic sense to cover all forms of sheet materials which are arranged in the form of a continuous web or strip.

The floating effect is secured, in the present embodiment, by grooving out the faces of the drums, to within an inch or two of the edges, to a depth of about $\frac{1}{16}$ of an inch, thus providing a recess or groove between the faces of the drums and the body of the film strip for the admission of a fluid pressure. The strip wraps all the way around each drum in the curing section, except for a short space where the sheet passes from one drum to the next. The problem now resolves itself into the necessity of supplying a fluid, such, for example as air, under a pressure which is just sufficient to support the strip, holding it in a taut condition such as may be found on the drum before grooving. It has been found that an air pressure of approximately .8 of an inch of water is sufficient with an average pull of approximately ½ pound per lineal inch of width. It is obvious, of course, that this pressure may have to be varied slightly to compensate for the difference in pull due to variations in the width and thickness of the sheet being formed.

In order to make this air pressure available where the support leaves one drum and passes to the next, a special end assembly, to be later described, is required to close in the two end spaces between the two drums. The end assemblies are connected together by two cylindrical parts, hereinafter more fully described, to fill up the two spaces where the drums approach and recede from each other, thus forming end reservoirs bounded by the end assemblies, the cross cylindrical pieces, and the two grooved drums carrying the support. Air under pressure is supplied from these reservoirs to the grooves in the drums to float the strip thereover. These reservoirs are supplied with air from a suitable source, not shown, through a suitable header positioned outside the machine. The cross members between the end assemblies are made semi-cylindrical, as will be described in due course, and are so arranged that when the leader stick passes through the air reservoirs, in the threading of the machine, the cross pieces rotate on their centers to allow the leader stick to pass freely through the air spaces, returning to the sealing position after such threading.

The air supplied to the different air reservoirs is air which is now brought into the curing section without any particular arrangement for its distribution. In the present arrangement of air floating, the air from the different reservoirs will be liberated to the curing sections at various points where the support passes from one drum to the next. The grooves in the faces of the drums are preferably kept shallow so that if the support should have a torn edge or a hole in the surface, allowing air pressure to escape, the strip will have a place on which to rest in order to be carried onto the next drum, thus eliminating the necessity of shutting down or rethreading the machine, as would be the case if the grooves were of any great depth.

In Fig. 1 there is shown a portion of the curing section of the machine for forming a film base or support. This section comprises a casing or housing 15 in which a plurality of drying or curing drums 16 are rotatably mounted in a manner illustrated in Fig. 1. These drums are rotated by means, not shown, so as to feed or advance the strip of film support through the machine from the coating wheel to the windup roll. The strip F is wound in a sinuous path over these drums, and is wrapped substantially all the way around each drum except for a short space where the support passes from one drum to the next, as will be apparent from inspection of Fig. 1. The casing 15 is preferably indented, as shown at 17, between the drums so that the air passing through the casing will be maintained in intimate contact with the support F on the drums 16 to insure complete curing of the support before it reaches the windup roll. It is well known to those in the art, that great care must be exercised in the handling of the film strip during the curing operation so as to eliminate abrasions, scratches, or wrinkles in the strip. Such defects would obviously render the support unsuitable for photographic purposes.

In order to overcome this difficulty, the present invention provides an arrangement whereby the strip F is supported only at its edges on the drums 16, while the central portion intermediate the edges is floated or supported on air so that this central portion is held out of contact with the drum faces. As only the center portion of the strip is coated to provide photographic film, the edge portions being slit off, it is apparent that the finished film support will be free from abrasions, scratches, or wrinkles which are normally caused when the full width of the strip contacts the surfaces of the feeding drums 16.

Each of the drums 16 has a face 20 thereof grooved out to provide a shallow peripherial groove or recess 21 which extends to within an inch or so of the sides of the drum 16 to provide marginal raised portions or ridges 22, all of which is clearly shown in Fig. 6. These marginal ridges are spaced a distance substantially equal to the width of the strip F, and support the latter only at its edges 23. The portion 24 of the strip intermediate the edges 23 overlies the groove 21, as will be apparent from inspection of Fig. 6. In order to maintain the central portion 24 out of contact with the face 20 of the drum, a steady fluid pressure is maintained in the groove 21 between the face 20 of the drum and the central portion 24 of the film strip. This fluid pressure thus floats the central portion of the strip and holds the latter away from the carrying face or surface 20 of the drum 16.

The pressure in the groove 21 is such as to maintain the full width of the strip substantially in the plane of the edges 23. This pressure will, of course, vary, as is pointed out above, depending upon the width and thickness of the strip F. It is to be clearly understood, however, that the central portion 24 of the strip is supported or floated entirely by reason of the static pressure of the fluid, such as air, in the groove 21, and not because of any air flow therein. Air in this space or groove remains substantially stationary except for slight leakage, as hereinafter pointed out.

In order to provide this static pressure in the groove 21, it is necessary to close in the area or spaces where the film strip passes from one drum to the next, as shown in Fig. 1. To this end, end assemblies, broadly indicated by the numeral 27, are provided for closing in the ends of these spaces, as shown in Fig. 6. The assembly at each end of the drum is preferably made up of two separate castings 28 and 29 which fit together on the center line 30 midway between the drum faces 20, as illustrated in Figs. 5 and 6. The idea of making each end assembly of two separate castings to fit together on the center line, is to allow each casting 28 and 29 to be fitted to the end of its drum 16. Thus, where one drum projects slightly beyond the next drum, an adjustment is necessary to make it possible to allow the same clearance between the end casting and the end of each drum, as clearly illustrated in Fig. 6. The machine frame 31 has mounted thereon, in any suitable and well known manner, supports for the end castings 28 and 29. Each of these supports comprises an L and a Z-shaped member 32 and 33 respectively arranged in the manner shown in Fig. 2. It is thus apparent from an inspection of Fig. 2, that the end castings 28 and 29 may be moved in or out on the L-shaped member 32, and the castings together with the L-shaped member may be moved horizontally on the Z-shaped member 33. By reason of this arrangement, the end castings may be adjusted in a vertical and/or horizontal plane to compensate for any misalignment of the drums 16.

When the end castings have been thus assembled in proper relation to the ends of the drums 16, the space between the faces of the two drums as they approach each other, and again where they recede from each other, is still left to be closed up. In order to accomplish this, a pair of tubes 34 are provided to house in or close the remaining open sides of the space between the two drums. The ends of each of these tubes are carried on ball-bearings 35 which are mounted on a stationary shaft 36 supported in the castings 28 and 29, in a manner to be hereinafter more fully described. The tubes 34 are of such size, about 2 inches in diameter, as to substantially close the space between the adjacent drum faces, as clearly shown in Fig. 8. These drums 34 thus cooperate with the castings 28 and 29 to provide an air reservoir between the two adjacent drums at the point where the strip passes from one drum to the next, as shown in Fig. 5.

When the machine is initially threaded, a leader stick, not shown, is attached to the end of the film support strip F, and the stick is then passed around the various drums 16 to thread the strip thereover. In order to permit the passage of this leader stick through the air reservoir, the tubes 34 and the shaft 36 are cut away, intermediate their ends, as shown at 37 and 38 respectively, Figs. 6 and 8. The exposed edges 40 of the cut away tube 34 have secured thereto, by means of metal plates 41, sealing strips 42 preferably of felt or other similar material. The plates 41 are detachably secured to the edges 40 by means of screws 43, or other suitable fastening means. The sealing strips 42 project radially beyond the surface of the tube 34 for a sufficient distance to engage the strip F and the bottom of the groove 21 on the adjacent drum 16, as clearly illustrated in Fig. 8.

These sealing strips thus provide an effective seal between the faces of the adjacent drums. The slight amount of air which may leak at this point will pass through the casing 15 to assist in the curing of the film strip. As the sealing strips 42 are secured to and movable bodily with the tubes 34, the latter may be broadly considered as means for sealing the spaces between the drum faces, as is apparent from Fig. 8. The tubes 34 may be suitably strengthened by means of a longitudinally extending rib 44 and a plurality of spaced cross ribs 45, see Figs. 6 and 8.

When the leader stick is passed through the air reservoir, the tubes 34 are oscillated or moved on the stationary shafts 36 to move the sealing strips 42 out of engagement with the drums 16. After the machine has been thus threaded, the tubes 34 with their sealing strips 42 must be returned to the sealing position shown in Fig. 8. The present invention, however, provides means for automatically returning these cut away tubes 34 to the sealing position shown in Fig. 8. To secure this result, the opposite ends of each shaft 36 have wrapped therearound coil spring 48, each of which has one end 49 thereof fastened to one end of a tube 34, while the other end 50 is anchored to a collar 51 rigidly secured to the shaft 36, as later described. Thus when the tube 34 is rotated on the stationary shaft 36 to permit the passing of the leader stick, the coil springs 48 are wound up or tensioned. After the leader stick has passed, the tubes 34 automatically turn, under the action of the coil springs 48, to the sealing position shown in Fig. 8. Return of each of the tubes 34 is limited by reason of the engagement of the end 55 of a slot 56, in the tube, with the head 57 of the screw 58 which is threaded into one of a plurality of radially threaded apertures 59 in the collar 51, all of which is clearly shown in Fig. 9.

It may be found, however, that when the machine is originally set up, the coil springs 48 have too much or too little tension. Means is, therefore, provided for suitably adjusting this tension. It is readily seen from an inspection of Fig. 6, that the springs 48 may be tensioned or released by means of a relative rotation of the tube 34 and the collars 51, the latter being rigidly secured to the shaft 36 by means of a set screw 62. Referring to Fig. 9, it will be apparent that if the set screw 62 is first removed and the collar 51 then rotated in a clockwise direction on the shaft 36, the tubes 34 being held stationary, the springs 48 will be wound up or tensioned. After the proper tension is secured, the screw 58 is then placed in the threaded opening 59 adjacent the end 55 of the slot 56, and the set screw 62 is then placed in the adjacent opening 59 to rigidly clamp the collar 51 to the shaft 36. Thus the collar 51 may be moved relative to the tubes 34 a distance of one or more openings 59 to properly tension the coil 48. Conversely, by rotating the collar 51 in a counterclockwise direction, the tension of the spring 48 may be reduced. While Fig. 6 only shows such an arrangement at one end of the tube 34, it is to be understood that a duplicate arrangement is provided at the other end of the tube 34, so that the tension of the springs 48 at the opposite ends may be separately and independently adjusted.

Due to the fact that there may be some discrepancy in the dimensions between the center lines of the drum 16, as well as endwise relation, the present invention also provides an arrangement for separately and independently adjusting the opposite ends of each shaft 36 and the tubes 34 so that these members may be moved back and forth on the center line 30 between the drums to effectively seal the space therebetween. This adjusting means comprises, in the preferred embodiment, a double plug which comprises a smaller plug 64 which is mounted eccentrically in the larger plug 65, as clearly shown in Fig. 10.

Each stationary shaft 36 passes through the tubes 34 and has the opposite ends mounted in and supported by the smaller plug 64 but on the center line in the larger plug 65. Thus, as the smaller plug, which is eccentric to the larger one, is rotated in one direction or the other, the stationary shaft 36 and its tubes 34 is carried forward or backward and also up or down depending upon the direction of rotation. The outer or larger plug 65 is then rotated in the castings 28 and 29, in which it is supported, in such a direction as to bring the center line of the shaft 36 back on to the center line 30 between the faces 20 of the adjacent drums 16, as will be apparent from the inspection of the drawings. When these eccentric plugs have thus been moved, they may be held in adjusted position by means of set screw 66 see Fig. 10. By means of this double plug arrangement, an adjustment can be made to obtain the proper clearance between the drums 16 and the cut away tubes 34. Each stationary shaft 36 is used solely as a support for the tube 34 and for adjusting purposes. The shaft 36 is also cut away, as above described to afford plenty of clearance space to allow the leader stick to pass through between it and the face 20 of the drums 16.

Air under suitable pressure is supplied to the air reservoir between the drums, through elliptical shaped openings 70 formed in the castings 28 and 29 of each of the end assemblies 27, see Fig. 5. Each of these openings is connected by a similarly shaped pipe or conduit 71 to a suitable source of air supply, not shown. The conduit 71 passes through an adjustable sleeve 72, and is supported in a flange 73 adjustable to an opening 74 in the machine frame 31. The sleeve 72 is preferably split and is arranged on opposite sides of the casing 15, as shown in Fig. 4, and secured thereto in any well known manner.

The operation of the above-described apparatus may be briefly summarized as follows. The air under pressure is supplied through the conduit 71 from a suitable source such as a fan, to the reservoir formed by the end castings 28 and 29 and the tubes 34 which effectively seal the spaces between the drums 16 where the strip F passes from one drum to the next. Air on reaching the reservoir fills the grooves 21 of the two adjacent drums so as to support the central portion 24 of the strip, due to static pressure of the air and not because of any air flow. The air in the reservoir is substantially stationary except for the slight leakage past the sealing strips 42 on the tubes 34. This leakage passes through the casting 15 to assist in the curing of the strip F. The central portion of the strip is thus floated on the air pressure so as not to contact the surface of the drum. The edges 23 of the strip, however, are supported on the marginal ridges 22 of the drums. The strip is thus passed through the entire machine by being supported only at its edges on the drum 16. The grooves 21 are preferably made shallow so that in case the strip F has a torn edge or a hole in the surface, allowing the air in the groove 21 to escape, the strip will have a place on which to rest in order to be carried onto the next drum 16 without requiring a shut down or rethreading of the machine.

When the machine is initially threaded, the tubes 34 are rotated on the stationary shafts 36 to permit the passage of the leader stick, the springs 48 returning the tubes to the sealing position. The double eccentric plugs 64 and 65 enable opposite ends of tubes 34 and the shaft 36 to be separately and independently adjusted along the center line 30 between the drums 16. The end castings 28 and 29 are adjustable by reason of the L and Z-shaped members 32 and 33 respectively.

It is thus apparent from the above description that the present invention provides an arrangement by which the body of the film support is floated through the curing section of the machine, the edges only of the strip engaging the feeding drum to advance the strip. It is also apparent that the strip is floated entirely by reason of the static pressure of the air and not because of air flow.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

I claim:

1. In a machine for treating a strip of sheet material, the combination with a rotating drum over which the strip is wrapped to feed the strip through the machine, of means on said drum for supporting said strip at its edges, a fluid channel adjacent said strip, and means for applying a fluid to said channel to support said strip intermediate said edges.

2. In a machine for treating a strip of sheet material, the combination with a rotating drum over which the strip is wrapped to feed the strip through the machine, of means on said drum for supporting said strip at its edges, a fluid pressure conduit between said drum and said strip, and means for applying a static fluid pressure to said conduit to support said strip between said edges.

3. In a machine for treating a strip of sheet material, the combination with a rotating drum over which the strip is wrapped to feed the strip through the machine, of marginal peripheral flanges on said drum adapted to engage and support said strip at its edges, said drum being formed with a peripheral groove intermediate said flanges, and means for introducing fluid pressure into said groove to support said strip intermediate said edges.

4. In a machine for treating a strip of sheet material, the combination with a rotating drum over which the strip is wrapped to feed the strip through the machine, of means on said drum for supporting said strip at its edges, fluid pressure means between said drum and said strip to support the latter intermediate its edges, and means engaging said drum and said strip for sealing the spaces between said strip and said drum at the points where said strip passes onto and leaves said drum.

5. In a machine for treating a strip of sheet material, the combination with a rotating drum over which the strip is wrapped to feed the strip through the machine, of means on said drum for supporting said strip at its edge, means for providing a fluid pressure between said drum and said strip to support the latter intermediate said edges, means engaging said drum and said strip for sealing the spaces therebetween and at the points where said strip passes onto and leaves said drum, said means being movable to an inoperative position so that said strip may be initially wrapped over said drum, and means for automatically returning said sealing means to sealing position after said strip has been initially wrapped over said drum.

6. In a machine for treating a strip of sheet material, the combination with a rotating drum over which the strip is wrapped to feed the strip through the machine, of means on said drums for supporting said strip at its edges, means for providing a fluid pressure between said drum and said strip to support the latter intermediate said edges, means engaging said drum and said strip for sealing the spaces therebetween at the points where said strip passes onto and leaves said drum, said means being movable to an inoperative position so that said strip may be initially wrapped over said drum, resilient means for automatically returning said sealing means to sealing position after said strip has been initially wrapped over said drum, means associated with said sealing means for tensioning said resilient means, and a stop to limit the return movement of said sealing means.

7. In a machine for treating a strip of sheet material, the combination with a rotating drum over which the strip is wrapped to feed the strip through the machine, of means on said drum for supporting said strip at its edges, means for providing a fluid pressure between said drum and said strip to support the latter intermediate said edges, means engaging said drum and said strip for sealing the spaces therebetween and at the points where said strip passes onto and leaves said drum, and means for adjusting said sealing means in a plurality of directions.

8. In a machine for treating a strip of sheet material, the combination with a rotating drum over which the strip is wrapped to feed the strip through the machine, of means on said drum for supporting said strip at its edges, means for providing a fluid pressure between said drum and said strip to support the latter intermediate said edges, means engaging said drum and said strip for sealing the spaces therebetween and at the points where said strip passes onto and leaves said drum, a supporting shaft for said sealing means, said sealing means being movable relative to said shaft to permit the initial wrapping of said strip over said drum, a coil spring connecting said shaft and said sealing means to return the latter to sealing position after said initial wrapping, a stop for limiting the return movement of said sealing means, and an adjustable mount for said shaft, said mount being movable in a plurality of directions to position said sealing means relative to said drum and said strip.

9. In a machine for treating a strip of sheet material, the combination with a rotating drum over which the strip is wrapped to feed the strip through the machine, of means on said drum for supporting said strip at its edges, means for providing a fluid pressure between said drum and said strip to support the latter intermediate said edges, means engaging said drum and said strip for sealing the spaces therebetween and at the points where said strip passes onto and leaves said drum, a supporting shaft for said sealing means, said sealing means being movable relative to said shaft to permit the initial wrapping of said strip over said drum, a coil spring connecting said shaft and said sealing means to return the latter to sealing position after said initial wrapping, a stop for limiting the return movement of said sealing means, and a double plug in which said shaft is supported, said plug comprising a pair of eccentric members movable relative to each other and to said shaft to position said sealing means to engage both said drum and said strip.

10. In a machine for treating a strip of sheet material, the combination with a rotating drum over which the strip is wrapped to feed the strip through the machine, of marginal peripheral flanges on said drum adapted to engage and support said strip at its edges only, said drum being recessed between said flanges, means for applying air under pressure to said recess to provide a static pressure therein to float said strip intermediate said flanges, tubular sealing members engaging said drum and said strip for sealing the spaces between the strip and drum adjacent the points where the strip passes onto and leaves said drum, shafts on which said tubular members are movably mounted, said tubular members being movable on said shafts to allow the initial threading of the film strip over said drum, said tubular members and said shafts being cut away intermediate the ends thereof to provide sufficient clearance space for said threading, coil springs connecting said shafts and said tubular members to return the members to their sealing position after said threading, stops on said shafts adapted to engage said tubular members to limit the return movement thereof, small eccentric plugs in which the ends of said shafts are supported, larger eccentric plugs which carry said smaller plugs, and a supporting casting for said larger plugs, said plugs being movable relative to each other and to said shaft to move said tubular member into position to engage both said drum and said strip.

11. In a machine for treating a strip of sheet material, the combination with a plurality of rotating drums over which the strip is arranged to feed the strip through the machine, of marginal peripheral flanges on said drums adapted to support said strip adjacent its edges, said drums being formed with a peripheral groove intermediate said flanges, means for applying fluid pressure to said groove to support said strip intermediate its edges, means for sealing the spaces between adjacent drums where the strip passes off of one drum and onto the next drum, certain of said sealing means being movable to a non-sealing position to allow initial threading of the strip through the machine, means for returning said certain means to sealing position, and means for adjusting said sealing means relative to said drums.

12. In a machine for treating a strip of sheet material, the combination with a plurality of rotating drums over which the strip is arranged to feed the strip through the machine, of marginal peripheral flanges on said drums adapted to support said strip adjacent its edges, each of said drums being formed with a peripheral groove intermediate said flanges, pairs of castings positioned at and engaging the opposite ends of adjacent drums at the periphery thereof to close in the ends of the spaces between said drums where the strip passes from one drum to the next, means connecting said castings to close and seal the spaces between the faces of said adjacent drums where they approach and recede from each other, said means cooperating with said castings to provide a substantial fluid tight reservoir where the strip passes from one drum to the next, means for applying a fluid under pressure to said reservoir to maintain a static pressure in said groove to support said strip intermediate said edges, said first mentioned means being movable to non-sealing position to permit threading of the machine, and means for separately adjusting said castings and said first-mentioned means.

13. In a machine for treating a strip of sheet material, the combination with a plurality of rotating drums over which the strip is arranged to feed the strip through the machine, of marginal peripheral flanges on said drums adapted to support said strip adjacent its edges, each of said drums being formed with a peripheral groove intermediate said flanges, pairs of castings positioned at and engaging the opposite ends of adjacent drums at the periphery thereof to close in the ends of the spaces between said drums where the strip passes from one drum to the next, a pair of shafts connecting said castings, and tubular members mounted on said shafts to close the spaces between the faces of said adjacent drums where the drums approach and recede from each other, resilient sealing strips carried by said tubular members and arranged to engage said strip and the face of the adjacent drum, said tubular member with its strips cooperating with said castings to provide a substantially fluid tight reservoir where the strip passes from one drum to the next, means for applying a fluid under pressure to said reservoir to maintain a static pressure in said groove to support said strip intermediate its edges on said fluid, said tubular members and said shafts being cut away intermediate their ends, said members being movable on said shafts to permit initial threading of the machine, resilient means for returning the tubular members and their sealing strips to sealing position after said threading, a collar on said shaft, a screw threaded onto said collar and arranged in the path of said tubular member to limit the return movement thereof, and means for separately adjusting said castings and said tubular members relative to said drums.

14. In a machine for treating a strip of sheet material, the combination with a plurality of rotating drums over which the strip is arranged to feed the strip through the machine, of marginal peripheral flanges on said drums adapted to support said strip adjacent its edges, each of said drums being formed with a peripheral groove intermediate said flanges, pairs of castings positioned at and engaging the opposite ends of adjacent drums at the periphery thereof to close in the ends of the spaces between said drums where the strip passes from one drum to the next, a pair of shafts connecting said castings, tubular members mounted on said shafts to close the spaces between the faces of said adjacent drums where the drums approach and recede from each other, resilient sealing strips carried by said tubular members and arranged to engage said strip and the face of the adjacent drum, said tubular member with its strips cooperating with said castings to provide a substantially fluid tight reservoir where the strip passes from one drum to the next, means for applying a fluid under pressure to said reservoir to maintain a static pressure in said groove to support said strip intermediate its edges on said fluid, said tubular members and said shafts being cut away intermediate their ends, said members being movable on said shafts to permit initial threading of the machine, resilient means for returning said tubular members and their sealing strips to sealing position after said threading, a collar mounted on said shaft, a screw threaded into said collar and arranged in the path of said tubular member to limit the return movement thereof, means for independently adjusting the pairs of castings at opposite ends of said drums, means for independently adjusting the opposite ends of each of said shafts along the center line between adjacent drums, said last-mentioned means comprising a double eccentric plug carried by said end castings and supporting said shafts, and means for locking said plugs in adjusted position.

HENRY E. VAN DERHOEF.